United States Patent
Suwabe et al.

(10) Patent No.: US 10,323,744 B2
(45) Date of Patent: Jun. 18, 2019

(54) CONTROL DEVICE FOR CONTINUOUSLY VARIABLE TRANSMISSION

(71) Applicant: JATCO ltd, Fuji-shi, Shizuoka (JP)

(72) Inventors: Tomoyuki Suwabe, Atsugi (JP); Shin Tsukamoto, Isehara (JP); Youhei Ishikawa, Sagamihara (JP)

(73) Assignee: JATCO LTD, Fuji-shi (JP)

( * ) Notice: Subject to any disclaimer, the term of this patent is extended or adjusted under 35 U.S.C. 154(b) by 0 days.

(21) Appl. No.: 15/552,155

(22) PCT Filed: Dec. 16, 2015

(86) PCT No.: PCT/JP2015/085137
§ 371 (c)(1),
(2) Date: Aug. 18, 2017

(87) PCT Pub. No.: WO2016/132642
PCT Pub. Date: Aug. 25, 2016

(65) Prior Publication Data
US 2018/0073634 A1    Mar. 15, 2018

(30) Foreign Application Priority Data

Feb. 19, 2015  (JP) ................................. 2015-030853

(51) Int. Cl.
*F16H 61/662* (2006.01)
*F16H 61/16* (2006.01)
(Continued)

(52) U.S. Cl.
CPC ........... *F16H 61/662* (2013.01); *F16H 61/16* (2013.01); *F16H 61/30* (2013.01);
(Continued)

(58) Field of Classification Search
None
See application file for complete search history.

(56) References Cited

U.S. PATENT DOCUMENTS

| 2002/0028727 A1 | 3/2002 | Iida et al. | |
| 2007/0099754 A1* | 5/2007 | Yamaguchi | F16H 61/66259 |
| | | | 477/44 |

(Continued)

FOREIGN PATENT DOCUMENTS

| JP | H08-177999 A | 7/1996 |
| JP | 2002-048226 A | 2/2002 |

(Continued)

*Primary Examiner* — Justin Holmes
(74) *Attorney, Agent, or Firm* — Foley & Lardner LLP

(57) ABSTRACT

Control device for continuously variable transmission (4) with auxiliary transmission having variator (20); hydraulic pressure control circuit (11) having primary pressure solenoid (11b); and transmission ratio controller (12) controlling the transmission ratio of variator (20) by feedback control. The transmission ratio controller (12) has a high limiter control unit (FIG. 5) that, when receiving a high transmission ratio limiting request, performs a high limiter control that limits the transmission ratio to a High limit line. The transmission ratio controller (12) also has a primary pressure lower limit regulation control unit (FIG. 4) that, when operation of the high limiter control is started during a time period when the transmission ratio is present at a High transmission ratio side with respect to the high limit transmission ratio, regulates a decrease of a primary command pressure to the primary pressure solenoid up to a High limiter-operated final target primary lower limit pressure.

10 Claims, 6 Drawing Sheets

(51) Int. Cl.
*F16H 61/30* (2006.01)
*F16H 59/44* (2006.01)
*F16H 59/48* (2006.01)

(52) U.S. Cl.
CPC ....... F16H 61/66259 (2013.01); *F16H 59/44* (2013.01); *F16H 59/48* (2013.01); *F16H 2061/66204* (2013.01)

(56) References Cited

U.S. PATENT DOCUMENTS

| | | | |
|---|---|---|---|
| 2009/0271079 A1* | 10/2009 | Kobayashi | B60K 6/48 701/51 |
| 2012/0135829 A1* | 5/2012 | Doihara | F16H 61/66272 474/28 |
| 2015/0075360 A1 | 3/2015 | Takahashi et al. | |
| 2015/0148156 A1 | 5/2015 | Yasui et al. | |

FOREIGN PATENT DOCUMENTS

| | | |
|---|---|---|
| WO | WO-2013/145971 A1 | 10/2013 |
| WO | WO-2013/190954 A1 | 12/2013 |

* cited by examiner

CONTROL DEVICE FOR CONTINUOUSLY VARIABLE TRANSMISSION

The present invention relates to a control device for a continuously variable transmission having a high limiter control function that limits a transmission ratio to a predetermined high limit transmission ratio.

BACKGROUND ART

There has been known a control device for a continuously variable transmission having a high limiter control function that inhibits shift of a transmission ratio to an upshift side from a certain transmission ratio with the aim of performing speed-change along driver's intention without a complicated shifting operation (for example, Patent Document 1).

In a case of the related art device, however, when issuing a command of a downshift toward a Low-transmission ratio by a high limiter by an operation of a high limit control, although a primary pressure is in a pressure-release direction, a low primary pressure region existing around a primary minimum pressure, where the primary pressure passes through due to the release of the primary pressure, overlaps with a dead region (or a no-reaction region) for a primary pressure solenoid. Further, a shift by the high limiter is a relatively gentle downshift along a shifting line.

In a normal downshift, in order to increase flexibility for execution of a shift control, the dead region of the primary pressure solenoid is used. In principle, the primary pressure is determined so as to balance with a secondary pressure of a required capacity for an input torque. As a scene in which the dead region is used in the normal shift control, it is a downshift Low command with a small input torque or a time of the shift. As this driving scene, it is a coast-down or an extremely low opening degree R/L travel (Road/Load travel) etc.

When explaining each driving scene, during the coast-down, as a belt protection control, the secondary pressure is increased with a torque from a driven side being an input in addition to an input torque from an engine. As a result, the primary pressure balancing with the secondary pressure is increased, then the primary pressure does not enter the dead region.

Regarding the extremely low opening degree R/L travel, although it uses the dead region, since a shift response is slow or dull, by decreasing an F/B gain, hunting does not occur.

Accordingly, in the normal shift control, by identifying the scene, whether the primary pressure enters the dead region or not is detected. And, even in a case where the primary pressure enters the dead region, by decreasing the F/B gain, the hunting is prevented, then the control can be executed without causing a problem.

On the other hand, even during the high limiter operation, it is conceivable that, in the same manner as the normal shift control, even in the case where the primary pressure enters the dead region, the F/B gain is decreased, then the dead region can be used. However, in this case, the following difference arises.

Depending on an operation condition of the high limiter, there is no other choice except to decrease a primary pressure command in a region that is different from an originally intended region, and the dead region is used in an indefinite region depending on the high limiter. That is, unlike the normal shift control, since the scene cannot be identified, even in the case where the primary pressure enters the dead region, the F/B gain cannot be decreased.

Because of this, in a scene in which the primary pressure is further decreased from a vicinity of the solenoid dead region, the primary pressure becomes unstable due to a hydraulic pressure control in the solenoid dead region. Then, in a feedback control of the transmission ratio, due to the fact that the unstable primary pressure is recognized as disturbance, the primary pressure varies up and down and the hunting occurs. As a consequence, as a problem, hunting of the transmission ratio occurs by and according to the hunting of the primary pressure.

CITATION LIST

Patent Document

Patent Document 1: Japanese Patent Provisional Publication No. 2002-048226

SUMMARY OF THE INVENTION

The present invention was made in view of the above problem. An object of the present invention is therefore to provide a control device for the continuously variable transmission which is capable of avoiding the hunting of the transmission ratio when decreasing the primary command pressure by the operation of the high limit control.

To achieve the above object, a control device for the continuously variable transmission of the present invention comprises: a continuously variable transmission mechanism; a hydraulic pressure control circuit; and a transmission ratio controller.

The continuously variable transmission mechanism continuously varies a transmission ratio by changing a winding diameter of a belt with respect to a primary pulley and a secondary pulley.

The hydraulic pressure control circuit has a primary pressure solenoid that controls a primary pressure supplied to the primary pulley.

The transmission ratio controller is configured to control the transmission ratio by a feedback control that fits an actual transmission ratio corresponding value to a target transmission ratio corresponding value.

The control device for the continuously variable transmission is provided with a high limiter control unit configured to, when receiving a high transmission ratio limiting request, perform a high limiter control that limits the transmission ratio to a predetermined high limit transmission ratio.

The transmission ratio controller has a primary pressure lower limit regulation control unit configured to, when an operation of the high limiter control is started during a time period when the transmission ratio is present at a High transmission ratio side with respect to the high limit transmission ratio, regulate a decrease of a primary command pressure to the primary pressure solenoid up to a primary pressure lower limit.

Therefore, when the operation of the high limiter control is started during a time period when the transmission ratio is present at the High transmission ratio side with respect to the high limit transmission ratio (a High limit line), the decrease of the primary command pressure to the primary pressure solenoid up to the primary pressure lower limit is regulated.

That is, by the fact that the transmission ratio is present at the High transmission ratio side with respect to the High limit line, by the start of the operation of the high limiter control, the downshift toward the Low-transmission ratio is commanded. Although the primary command pressure is in the pressure-release direction in this downshift, the primary command pressure is limited to the decrease up to the primary pressure lower limit. Therefore, the primary command pressure is prevented from passing through the region of the solenoid dead region of the primary pressure solenoid, then the primary pressure is prevented from being unstable due to the hydraulic pressure control in the solenoid dead region. Hence, even if the feedback control of the transmission ratio is carried out, the hunting of the primary command pressure can be suppressed. As a consequence, when decreasing the primary command pressure by the operation of the high limit control, the hunting of the transmission ratio can be suppressed.

EMBODIMENTS FOR CARRYING OUT THE INVENTION

Figure 1:
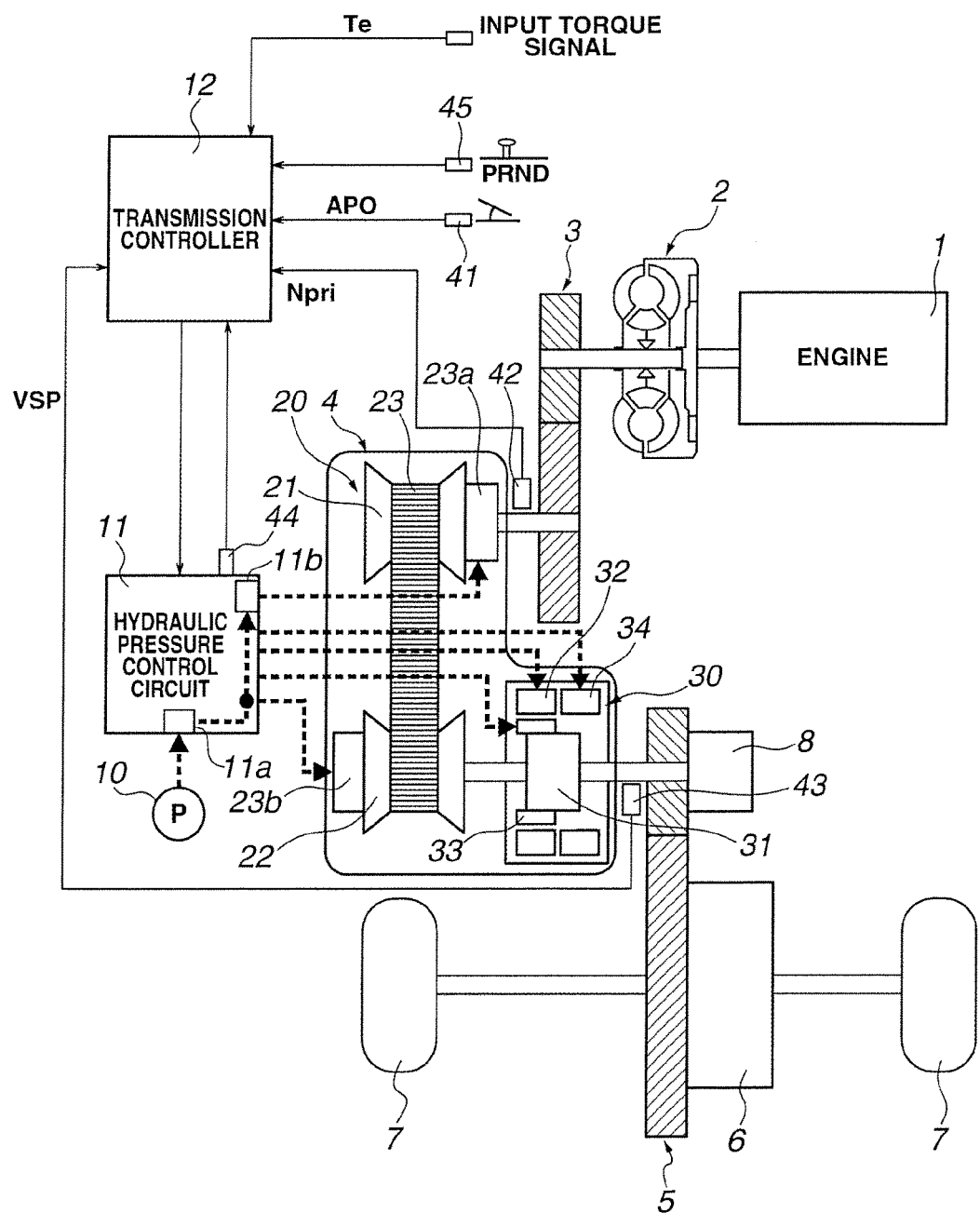
FIG. 1 is a general system diagram of a vehicle having a continuously variable transmission with an auxiliary transmission (an example of a continuously variable transmission) to which a control device according to an embodiment 1 is applied.

In the following description, a control device for continuously variable transmission of the present invention will be explained according to an embodiment 1 shown in the drawings.

Embodiment 1

First, a configuration will be explained.

The control device of the embodiment 1 is a control device applied to an engine vehicle in which a continuously variable transmission having an auxiliary transmission is mounted. A configuration of the control device of the continuously variable transmission having the auxiliary transmission of the embodiment 1 will be separately explained by [General system configuration], [Shift control configuration by shift map] and [Primary pressure lower limit regulation control process configuration].

[General System Configuration]

Figure 2:
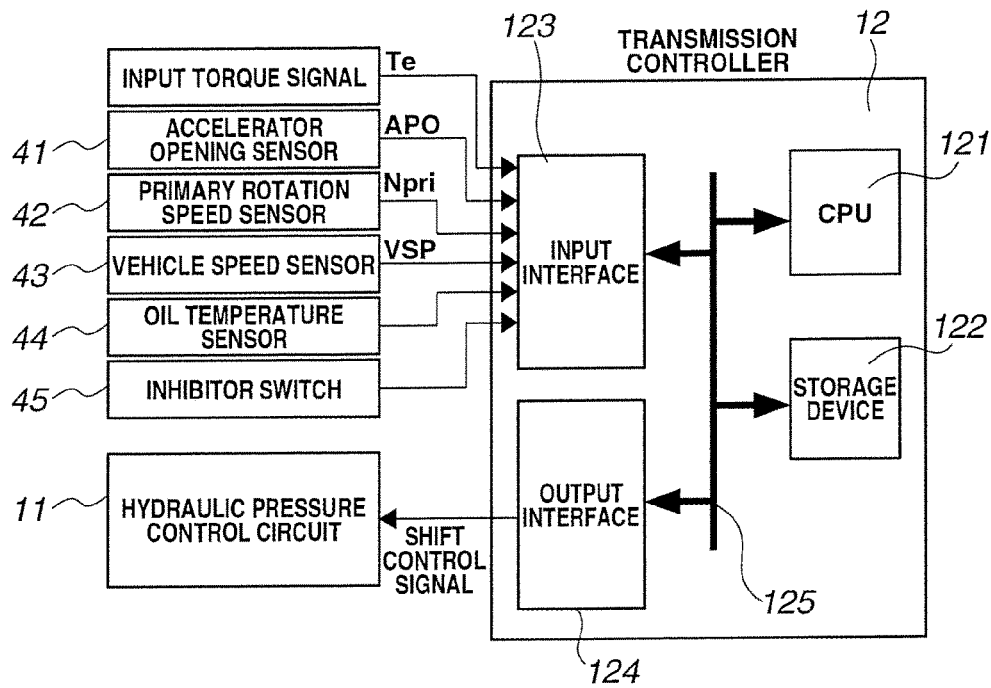
FIG. 2 is a block diagram showing an inside configuration of a transmission controller of the embodiment 1.

FIG. 1 shows a general system diagram of a vehicle having the continuously variable transmission with the auxiliary transmission to which the control device according to the embodiment 1 is applied. FIG. 2 shows an inside configuration of a transmission controller. A general system configuration will be explained below with reference to FIGS. 1 and 2.

Here, in the following description, "transmission ratio" of a certain transmission mechanism is a value obtained by dividing an input rotation speed by an output rotation speed of the transmission mechanism. Further, "Lowest transmission ratio" means a maximum transmission ratio of the transmission mechanism, while "Highest transmission ratio" means a minimum transmission ratio of the transmission mechanism.

The vehicle having the continuously variable transmission with the auxiliary transmission has an engine 1 as a driving source. Output rotation from the engine 1 is transmitted to a driving wheel 7 through a torque converter 2 equipped with a lock-up clutch, a first gear train 3, a continuously variable transmission 4, a second gear train 5 and a final speed reduction device 6. The second gear train 5 is provided with a parking mechanism 8 that mechanically locks an output shaft of the continuously variable transmission 4 so that the output shaft of the continuously variable transmission 4 can not rotate upon parking. Further, the vehicle has an oil pump 10 that is driven by using a part of power of the engine 1, a hydraulic pressure control circuit 11 that controls a hydraulic pressure from the oil pump 10 and provides it to each part of the continuously variable transmission 4, and a transmission controller 12 that controls the hydraulic pressure control circuit 11. Each configuration will be explained below.

The continuously variable transmission 4 has a continuously variable transmission mechanism (hereinafter, called a variator 20) and an auxiliary transmission mechanism 30 provided in series with the variator 20. "provided in series with" means that the variator 20 and the auxiliary transmission mechanism 30 are arranged in series on a same power transmission path. The auxiliary transmission mechanism 30 is directly connected to an output shaft of the variator 20 as shown in this embodiment, or could be connected to the variator 20 through another transmission mechanism or another power transmission mechanism (for instance, a gear train).

The variator 20 is a belt-type continuously variable transmission mechanism having a primary pulley 21, a secondary pulley 22 and a V-belt 23 wound around these pulleys 21 and 22 and rotating around these pulleys 21 and 22. Each of the primary pulley 21 and the secondary pulley 22 has a stationary conical plate (a stationary sheave) and a movable conical plate (a movable sheave) that is set with both sheave surfaces of the stationary and movable conical plates facing each other so as to form a V-shaped groove between the stationary and movable conical plates. Further, the primary pulley 21 and the secondary pulley 22 respectively have hydraulic cylinders 23a and 23b each of which is provided on a back surface of the movable conical plate and moves the movable conical plate in an axial direction of the movable conical plate. When controlling a hydraulic pressure provided to the hydraulic cylinders 23a and 23b, each width of the V-shaped groove varies, and each contact radius between the V-belt 23 and each of the pulleys 21 and 22 varies, then a transmission ratio of the variator 20 continuously varies.

The auxiliary transmission mechanism 30 is a transmission mechanism of forward 2 speeds and reverse 1 speed. The auxiliary transmission mechanism 30 has a ravigneaux planetary gear mechanism 31 in which carriers of two planetary gears are connected and a plurality of frictional engagement elements (a Low brake 32, a High clutch 33 and a Rev brake 34) which are engaged with a plurality of rotational elements that form the ravigneaux planetary gear mechanism 31 and which change their engagement states. By controlling a supply pressure to each of the frictional engagement elements 32 to 34 and performing a changeover shift that changes an engaging/disengaging state of each of the frictional engagement elements 32 to 34, a speed (a speed stage or a shift stage) of the auxiliary transmission mechanism 30 is changed. For instance, when the Low brake 32 is engaged and the High clutch 33 and the Rev brake 34 are each disengaged, the speed of the auxiliary transmission mechanism 30 is 1st speed. When the High clutch 33 is engaged and the Low brake 32 and the Rev brake 34 are each disengaged, the speed of the auxiliary transmission mechanism 30 is 2nd speed whose transmission ratio is smaller than that of the 1st speed. When the Rev brake 34 is engaged and the Low brake 32 and the High clutch 33 are each disengaged, the speed of the auxiliary transmission mechanism 30 is the reverse speed. Hereinafter, the 1st speed of the auxiliary transmission mechanism 30 is called "a low speed mode", and the 2nd speed of the auxiliary transmission mechanism 30 is called "a high speed mode".

As shown in FIG. 2, the transmission controller 12 is formed from a CPU 121, a storage device 122 having RAM and ROM, an input interface 123, an output interface 124 and a bus 125 connecting these components to each other.

The input interface 123 inputs an output signal of an accelerator opening degree sensor 41 that detects an accelerator opening APO, an output signal of a primary rotation speed sensor 42 that detects a primary rotation speed Npri of the continuously variable transmission 4 and an output signal of a vehicle speed sensor 43 that detects a vehicle speed VSP. Further, the input interface 123 inputs an output signal of an oil temperature sensor 44 that detects an ATF oil temperature of the continuously variable transmission 4, an output signal of an inhibitor switch 45 that detects a position of a selection lever, a torque signal Te that is a signal of an output torque of the engine 1, and so on.

The storage device 122 stores therein a shift control program of the continuously variable transmission 4 and a shift map (FIG. 3) used for this shift control program. The CPU 121 reads the shift control program stored in the storage device 122 and executes it. Also, the CPU 121 generates a shift control signal by performing computation for each signal inputted through the input interface 123, and outputs the shift control signal to the hydraulic pressure control circuit 11 through the output interface 124. Each value used for the computation by the CPU 121 and its computation result are stored in the storage device 122 as appropriate.

The hydraulic pressure control circuit 11 is formed by a plurality of hydraulic pressure control valves including a line pressure solenoid 11a and a primary pressure solenoid 11b and a plurality of flow passages. The hydraulic pressure control circuit 11 controls (regulates) a pump discharge pressure of the oil pump 10 to a line pressure PL on the basis of a line command pressure outputted to the line pressure solenoid 11a from the transmission controller 12. Then, the hydraulic pressure control circuit 11 controls (regulates) the line pressure PL to a primary pressure Ppri on the basis of a primary command pressure outputted to the primary pressure solenoid 11b from the transmission controller 12. The regulated primary pressure Ppri is provided to the hydraulic cylinder 23a of the primary pulley 21. The line pressure PL is provided to the hydraulic cylinder 23b of the secondary pulley 22. That is, a pressure control system of the primary pressure Ppri and a secondary pressure Psec to the variator 20 is a single pressure control system (or a one-side pressure control system) with the secondary pressure Psec being the line pressure PL. Further, in addition to the pressure control of the primary pressure Ppri and the secondary pressure Psec to the variator 20, the hydraulic pressure control circuit 11 controls (regulates) a hydraulic pressure that changes the speed (the speed stage or the shift stage) of the auxiliary transmission mechanism 30, then the shift (the speed change) of the continuously variable transmission 4 is carried out. Regarding a transmission ratio control of the variator 20, the transmission ratio is controlled by a feedback control that controls a pressure difference DP between the primary pressure Ppri and the secondary pressure Psec so as to fit or equalize the primary rotation speed Npri (an actual transmission ratio corresponding value) to a target primary rotation speed Npri* (a target transmission ratio corresponding value).

[Shift Control Configuration by Shift Map]

Figure 3:
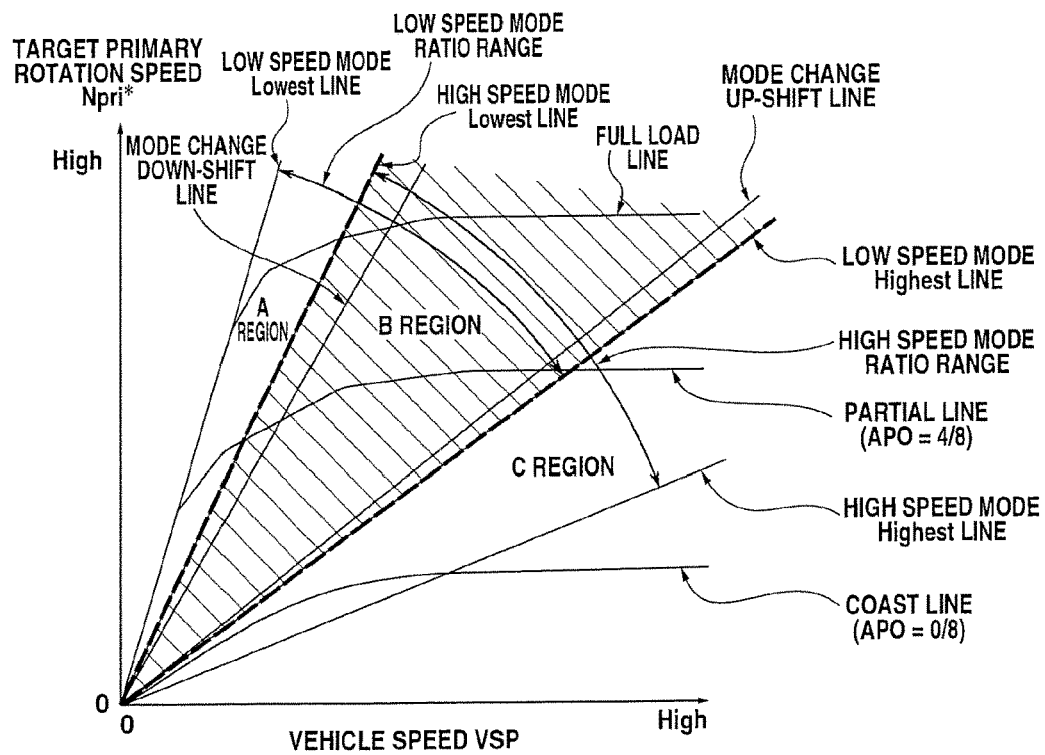
FIG. 3 is a shift map showing an example of a shift map stored in a storage device of the transmission controller of the embodiment 1.

FIG. 3 is a shift map showing an example of a shift map stored in the storage device 122 of the transmission controller 12. A shift control configuration by the shift map will be explained below with reference to FIG. 3.

An operating point of the continuously variable transmission 4 is determined on the basis of the vehicle speed VSP and the accelerator opening APO on the shift map shown in FIG. 3. A gradient of a line connecting the operating point of the continuously variable transmission 4 and a zero point at a lower left corner of the shift map indicates the transmission ratio (a total transmission ratio obtained by multiplying the transmission ratio of the variator 20 by the transmission ratio of the auxiliary transmission mechanism 30, hereinafter, called "a through transmission ratio") of the continuously variable transmission 4. In this shift map, a shift line is set for each accelerator opening APO, in the same manner as a conventional shift map of a belt type continuously variable transmission. The shift of the continuously variable transmission 4 is carried out in accordance with the shift line that is selected according to the accelerator opening APO. Here, in FIG. 3, to simplify the shift map, only a full load line (a shift line of the accelerator opening APO=8/8), a partial line (a shift line of the accelerator opening APO=4/8) and a coast line (a shift line of the accelerator opening APO=0) are illustrated.

When the continuously variable transmission 4 is in the low speed mode, the shift of the continuously variable transmission 4 can be varied between a low speed mode Lowest line obtained by setting the transmission ratio of the variator 20 to the maximum and a low speed mode Highest line obtained by setting the transmission ratio of the variator 20 to the minimum. At this time, the operating point of the continuously variable transmission 4 moves in an A region and a B region. On the other hand, when the continuously variable transmission 4 is in the high speed mode, the shift of the continuously variable transmission 4 can be varied between a high speed mode Lowest line obtained by setting the transmission ratio of the variator 20 to the maximum and a high speed mode Highest line obtained by setting the transmission ratio of the variator 20 to the minimum. At this time, the operating point of the continuously variable transmission 4 moves in the B region and a C region.

The transmission ratio of each speed (each speed stage or each shift stage) of the auxiliary transmission mechanism 30 is set so that a transmission ratio (a low speed mode Highest transmission ratio) corresponding to the low speed mode Highest line is smaller than a transmission ratio (a high speed mode Lowest transmission ratio) corresponding to the high speed mode Lowest line. With this setting, a low speed mode ratio range that is a range of the through transmission ratio, which can be taken in the low speed mode, of the continuously variable transmission 4 and a high speed mode ratio range that is a range of the through transmission ratio, which can be taken in the high speed mode, of the continuously variable transmission 4 partly overlap with each other. When the operating point of the continuously variable transmission 4 is positioned in the B region (an overlap region) defined between the high speed mode Lowest line and the low speed mode Highest line, as the mode of the continuously variable transmission 4, either of the low speed mode and the high speed mode can be selected.

The transmission controller 12 reads this shift map and sets the through transmission ratio corresponding to the vehicle speed VSP and the accelerator opening APO (the operating point) as an attainment through transmission ratio. This attainment through transmission ratio is a target value which the through transmission ratio should finally attain or reach in this operating condition. The transmission controller 12 sets a target through transmission ratio that is a transient target value in order for the through transmission ratio to follow the attainment through transmission ratio with a predetermined response characteristic, and controls the variator 20 and the auxiliary transmission mechanism 30 so that the through transmission ratio is fitted to or identical with the target through transmission ratio.

On the shift map, a mode change up-shift line (a 1→2 up-shift line of the auxiliary transmission mechanism 30) by which an up-shift of the auxiliary transmission mechanism 30 is performed is set at a position that is a Low side transmission ratio with respect to the low speed mode Highest line. Further, on the shift map, a mode change down-shift line (a 2→1 down-shift line of the auxiliary transmission mechanism 30) by which a down-shift of the auxiliary transmission mechanism 30 is performed is set at a position that is a High side transmission ratio with respect to the high speed mode Lowest line.

Then, in a case where the operating point of the continuously variable transmission 4 crosses the mode change up-shift line or the mode change down-shift line, i.e. in a case where the target through transmission ratio of the continuously variable transmission 4 changes by crossing a mode change transmission ratio or is identical with the mode change transmission ratio, the transmission controller 12 performs a mode change shift control. In the mode change shift control, the transmission controller 12 performs a cooperative control that coordinates the two transmission ratios of the variator 20 and the auxiliary transmission mechanism 30 such that the transmission ratio of the variator 20 is changed in a direction opposite to a direction of change of the transmission ratio of the auxiliary transmission mechanism 30 while performing the shift of the auxiliary transmission mechanism 30.

In the cooperative control, when the target through transmission ratio of the continuously variable transmission 4 crosses the mode change up-shift line, the transmission controller 12 outputs a 1→2 up-shift request and changes the speed of the auxiliary transmission mechanism 30 from the 1st speed to the 2nd speed, and also changes the transmission ratio of the variator 20 to a Low transmission ratio. On the other hand, when the target through transmission ratio of the continuously variable transmission 4 crosses the mode change down-shift line, the transmission controller 12 outputs a 2→1 down-shift request and changes the speed of the auxiliary transmission mechanism 30 from the 2nd speed to the 1st speed, and also changes the transmission ratio of the variator 20 to a High transmission ratio side.

[Primary Pressure Lower Limit Regulation Control Process Configuration]

Figure 4:
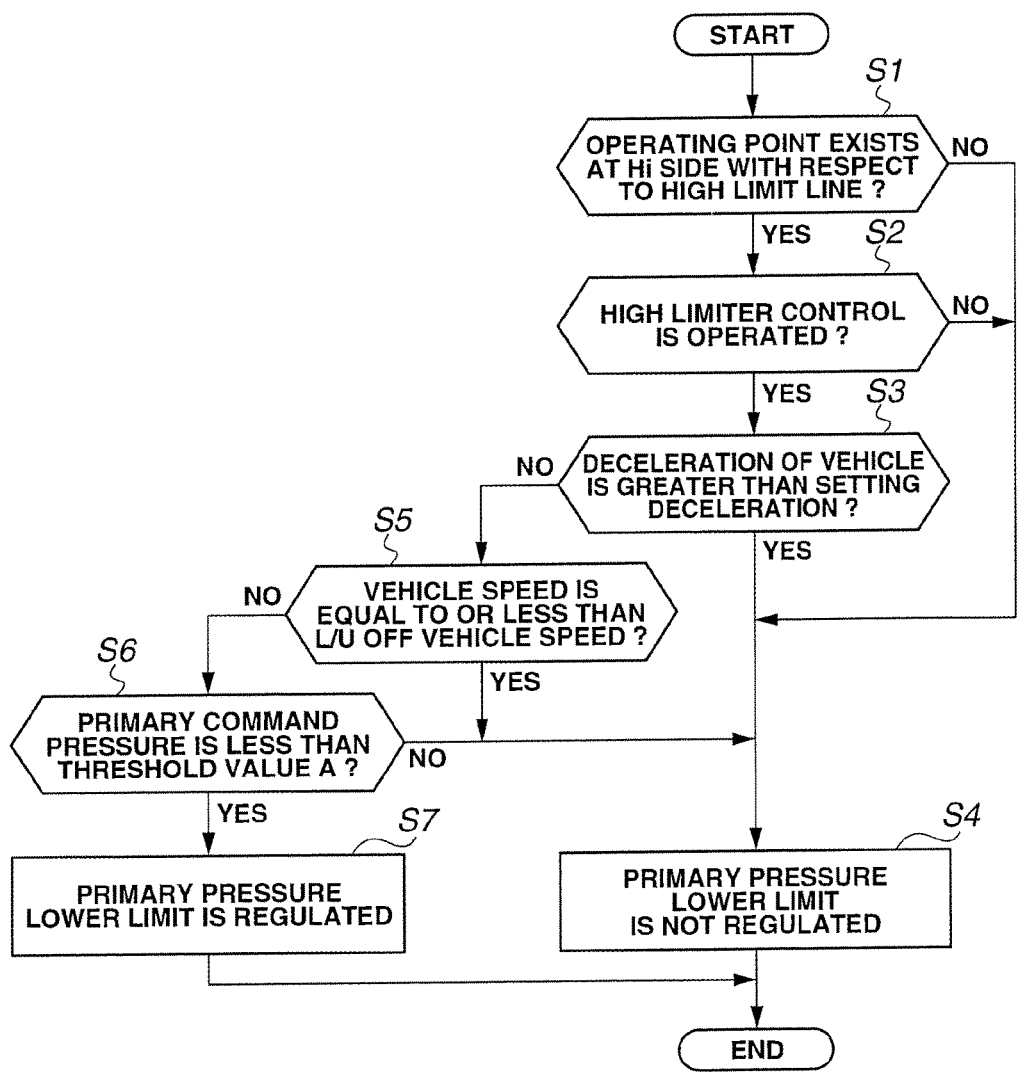
FIG. 4 is a flow chart showing flows of a process of a primary pressure lower limit regulation control executed by the transmission controller of the embodiment 1.

FIG. 4 is a flow chart showing flows of a process of a primary pressure lower limit regulation control (a primary pressure lower limit regulation control unit or section) executed by the transmission controller 12 of the embodiment 1. In the following description, each step in FIG. 4 showing the primary pressure lower limit regulation control process configuration will be explained.

At step S1, a judgment is made as to whether or not the operating point (VSP, APO) by the vehicle speed VSP and the accelerator opening APO on the shift map exists at a High transmission ratio side with respect to a High limit line. If YES (the operating point (VSP, APO) exists at the High transmission ratio side with respect to the High limit line), the routine proceeds to step S2. If NO (the operating point (VSP, APO) exists at a Low transmission ratio side including the High limit line), the routine proceeds to step S4.

Figure 5:
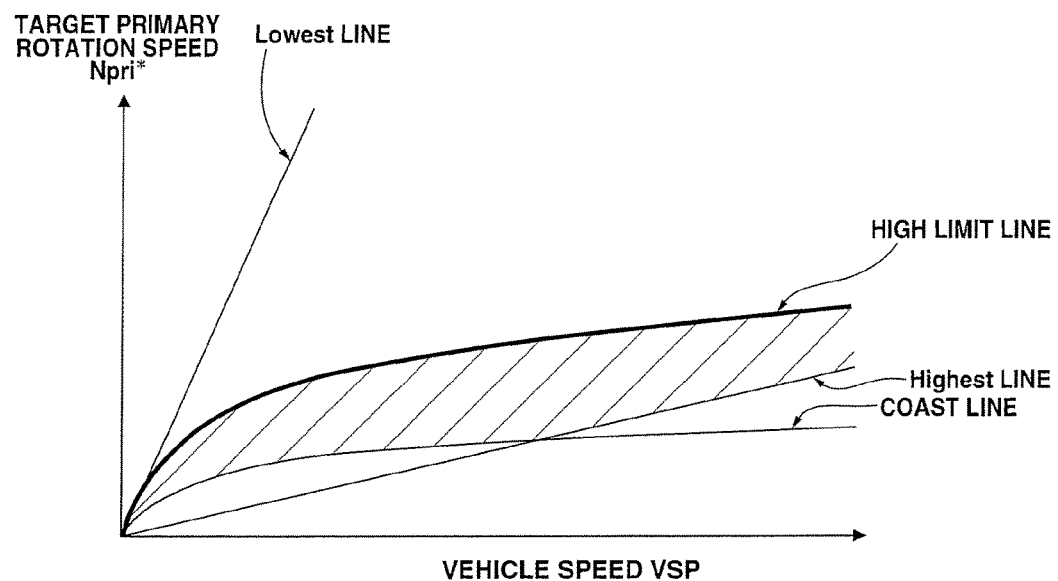
FIG. 5 is a shift map showing a high limit line used in a high limiter control executed by the transmission controller of the embodiment 1.
Figure 6:
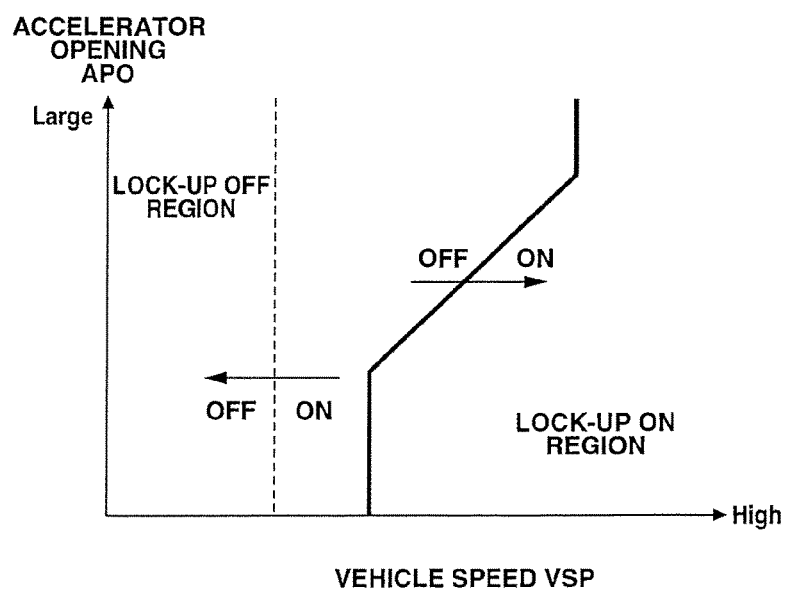
FIG. 6 is a lock-up map showing an example of a lock-up map used in an engagement/disengagement control of a lock-up clutch by the transmission controller of the embodiment 1.

Here, the transmission controller 12 has a high limiter control (a high limiter control unit) that, with the aim of improving heating performance, when receiving a minimum engine rotation speed command from an engine control side at engine cooling-down, outputs a high transmission ratio limiting request so as to keep the minimum engine rotation speed. The "High limit line" to determine a high limit transmission ratio in this high limiter control is set so as to extend along a low accelerator opening line at a Low side with respect to the Highest line as shown in FIG. 5. Therefore, "the operating point (VSP, APO) exists at the High transmission ratio side with respect to the High limit line" means, as shown by a hatch pattern in FIG. 5, the operating point (VSP, APO) exists in an region enclosed with the High limit line, the Highest line and the coast line on the shift map.

At step S2, after judging that the operating point (VSP, APO) exists at the High transmission ratio side with respect to the High limit line at step S1, a judgment is made as to whether or not the high limiter control is operated. If YES (the high limiter control is operated), the routine proceeds to step S3. If NO (the high limiter control is not operated), the routine proceeds to step S4.

Here, "the high limiter control is operated (the high limiter control is in progress)" indicates a time period from a start of the operation of the high limiter control by the high transmission ratio limiting request to an end of the operation of the high limiter control by satisfaction of an end condition showing that the operating point (VSP, APO) has reached the High limit line.

At step S3, after judging that the high limiter control is operated at step S2, a judgment is made as to whether or not a deceleration of the vehicle is greater than a setting deceleration. If YES (the vehicle deceleration>the setting deceleration), the routine proceeds to step S4. If NO (the vehicle deceleration≤the setting deceleration), the routine proceeds to step S5.

Here, the vehicle deceleration is obtained by a sensor signal from a back-and-forth G sensor or by a differential operation of a sensor value from the vehicle speed sensor 43.

As the setting deceleration, a deceleration level by which a gradient of decrease of the primary command pressure becomes large and influence of hunting becomes small is determined by an experiment, and the setting deceleration is fixed.

At step S4, after judging that the operating point (VSP, APO) exists at the Low transmission ratio side including the High limit line at step S1, or after judging that the high limiter control is not operated at step S2, or after judging that the vehicle deceleration is greater than the setting deceleration (the vehicle deceleration>the setting deceleration) at step S3, or after judging that the vehicle speed is equal to or less than an L/U OFF vehicle speed at step S5, or after judging that the primary command pressure is equal to or greater than a threshold value A (the primary command pressure≥the threshold value A) at step S6, the routine proceeds to END without regulating (imposing) the primary pressure lower limit.

At step S5, after judging that the vehicle deceleration is equal to or less than the setting deceleration (the vehicle deceleration≤the setting deceleration) at step S3, a judgment is made as to whether or not the vehicle speed is equal to or less than the LILT OFF vehicle speed. If YES (the vehicle speed≤the L/U OFF vehicle speed), the routine proceeds to step S4. If NO (the vehicle speed>the L/U OFF vehicle speed), the routine proceeds to step S6.

At step S6, after judging that the vehicle speed is greater than the L/U OFF vehicle speed (the vehicle speed>the L/U OFF vehicle speed) at step S5, a judgment is made as to whether or not the primary command pressure outputted to the primary pressure solenoid 11b is less than the threshold value A. If YES (the primary command pressure<the threshold value A), the routine proceeds to step S7. If NO (the primary command pressure≥the threshold value A), the routine proceeds to step S4.

Figure 7:
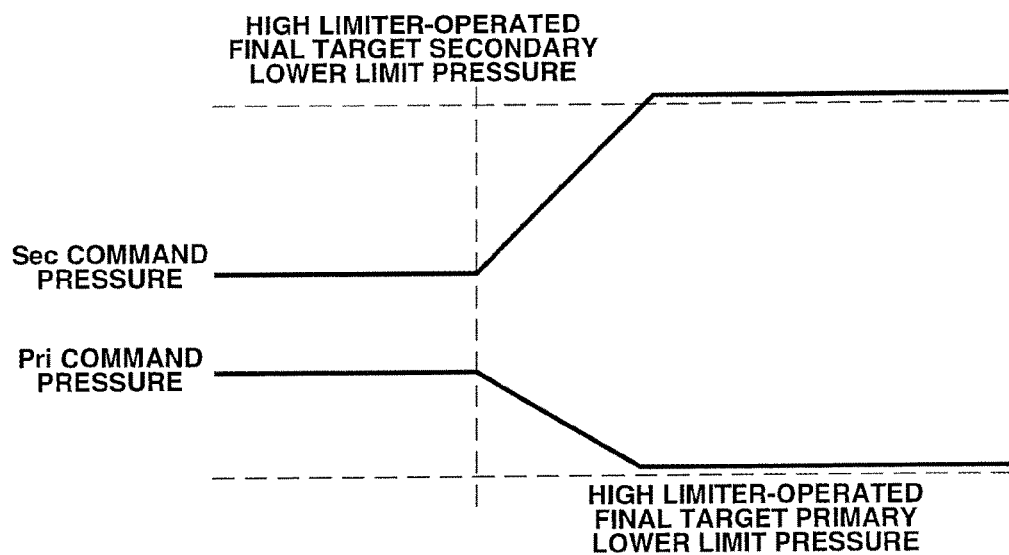
FIG. 7 is a drawing showing a secondary command pressure characteristic and a primary command pressure characteristic when the high limiter control executed by the transmission controller of the embodiment 1 is operated.

Here, the "threshold value A" indicates a "High limiter-operated final target primary lower limit pressure" when regulating (imposing) the lower limit of the primary pressure in the high limiter control by a forced downshift that increases a secondary command pressure and decreases the primary command pressure, as shown in FIG. 7. This threshold value A is set to a value that is higher than a dead region (or a no-reaction region) for the primary pressure solenoid 11b so as not to use a solenoid dead region (a solenoid no-reaction region). Further, the threshold value A is determined by a value that is not greatly separated from the dead region so as not to excessively increase the secondary pressure Psec. More specifically, a proper lower limit pressure is determined on the basis of characteristics of solenoid current I of the primary pressure solenoid 11b and the primary pressure Ppri, characteristics of the primary command pressure and the primary pressure Ppri, and a range of product variation of the primary pressure solenoid 11b.

At step S7, after judging that the primary command pressure is less than the threshold value A (the primary command pressure<the threshold value A) at step S6, the primary pressure lower limit is regulated (imposed), and the routine proceeds to END.

Here, in the high limiter control, when regulating the primary command pressure, as shown in FIG. 7, the secondary pressure Psec to secure a pressure control margin (a region in which the shift is performed by the primary pressure Ppri) of the primary pressure Ppri is determined as a secondary pressure lower limit (=a High limiter-operated final target secondary lower limit pressure). Then, as shown in FIG. 7, a limit is imposed on each rate of change of increase of the secondary command pressure up to the High limiter-operated final target secondary lower limit pressure and decrease of the primary command pressure up to the High limiter-operated final target primary lower limit pressure, and the forced downshift is carried out while coordinating with each other. Here, the forced downshift is a downshift performed independently of an accelerator pedal operation or a vehicle speed change.

Next, working and effect will be explained. Working and effect of the control device of the continuously variable transmission 4 having the auxiliary transmission according to the embodiment 1 will be separately explained by [Working and effect of primary pressure lower limit regulation control], [Working and effect of high limit control by primary pressure lower limit regulation] and [Feature of primary pressure lower limit regulation control].

[Working and Effect of Primary Pressure Lower Limit Regulation Control]

Working and effect of the primary pressure lower limit regulation control will be explained on the basis of a flow chart shown in FIG. 4. Here, a judging condition as to whether the operating point (VSP, APO) exists at the High transmission ratio side with respect to the High limit line on the shift map at step S1 is called "High transmission ratio condition". Further, a judging condition as to whether the high limiter control is operated at step S2 is called "high limiter control operation condition".

When the High transmission ratio condition is not satisfied, in the flow chart of FIG. 4, the routine proceeds to step S1→step S4→END. At step S4, the primary pressure lower limit is not regulated (imposed).

When the High transmission ratio condition is satisfied and the high limiter control operation condition is not satisfied, in the flowchart of FIG. 4, the routine proceeds to step S1→step S2→step S4→END. At step S4, the primary pressure lower limit is not regulated (imposed).

When the High transmission ratio condition and the high limiter control operation condition are both satisfied and a deceleration condition indicating that the vehicle deceleration is greater than the setting deceleration is satisfied, in the flow chart of FIG. 4, the routine proceeds to step S1→step S2→step S3→step S4→END. At step S4, the primary pressure lower limit is not regulated (imposed).

When the High transmission ratio condition and the high limiter control operation condition are both satisfied and the deceleration condition indicating that the vehicle deceleration is greater than the setting deceleration is not satisfied and a low vehicle speed condition indicating that the vehicle speed is equal to or less than the L/U OFF vehicle speed is satisfied, in the flow chart of FIG. 4, the routine proceeds to step S1→step S2→step S3→step S5→step S4→END. At step S4, the primary pressure lower limit is not regulated (imposed).

When the High transmission ratio condition and the high limiter control operation condition are both satisfied and the deceleration condition indicating that the vehicle deceleration is greater than the setting deceleration is not satisfied and the low vehicle speed condition indicating that the vehicle speed is equal to or less than the L/U OFF vehicle speed is not satisfied, in the flow chart of FIG. 4, the routine proceeds to step S1→step S2→step S3→step S5→step S6. Then, at all times during judgment of the primary command pressure≥the threshold value A at step S6, the routine proceeds to step S4→END from step S6. At step S4, the primary pressure lower limit is not regulated (imposed). On the other hand, when judged that the primary pressure solenoid 11b is less than the threshold value A (the primary command pressure<the threshold value A) at step S6, the routine proceeds to step S7→END from step S6. At step S7, the primary pressure lower limit is regulated (imposed).

In this manner, only when the High transmission ratio condition and the high limiter control operation condition are both satisfied and the deceleration condition and the low vehicle speed condition are both not satisfied, the primary command pressure to the primary pressure solenoid 11b is limited to the decrease up to the High limiter-operated final target primary lower limit pressure regulated (imposed) as the primary pressure lower limit.

[Working and Effect of High Limit Control by Primary Pressure Lower Limit Regulation]

First, working and effect of a comparative example in which the decrease of the primary command pressure is not regulated (imposed) when an operation of the high limit control is started by a downshift command toward a Low-transmission ratio will be explained with reference to FIG. 8.

Figure 8:
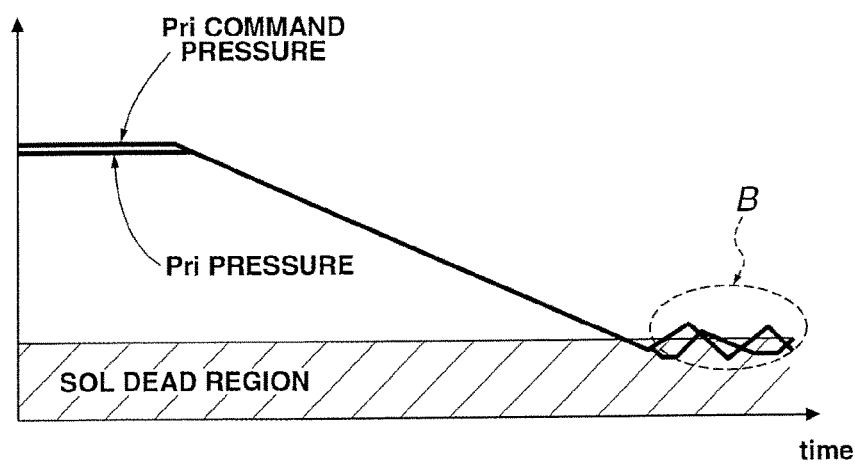
FIG. 8 is an explanatory drawing showing a primary command pressure and hunting of a primary pressure in a case where a primary pressure lower limit is not regulated when a high limiter control is operated in a comparative example.

When the high limit control is operated by the downshift command toward the Low-transmission ratio, as shown in FIG. 8, although the primary pressure Ppri is in a pressure-release direction, a low primary pressure region where the primary pressure Ppri passes through due to the release of the primary pressure Ppri overlaps with the solenoid dead region (the solenoidno-reaction region) for the primary pressure solenoid. Because of this, in a scene in which the primary pressure Ppri is further decreased from a vicinity of the solenoid dead region, the primary pressure Ppri becomes unstable due to a hydraulic pressure control in the solenoid dead region. Then, in a feedback control of the transmission ratio, due to the fact that the unstable primary pressure Ppri is recognized as disturbance, as shown by a characteristic encircled with a dotted circle of an arrow B in FIG. 8, the primary pressure Ppri varies up and down and the hunting occurs. As a consequence, when decreasing the primary command pressure by the operation of the high limit control, due to the fact that hunting of the primary pressure Ppri to determine a winding diameter of the primary pulley 21 occurs, hunting of the transmission ratio occurs.

In contrast to this, when the high limit control is operated by the downshift command toward the Low-transmission ratio, the embodiment 1 imposes the limit on the decrease of the primary command pressure so as not to use the solenoid dead region. In the following description, the working or operation of the high limit control by the primary pressure lower limit regulation according to the embodiment 1 will be explained on the basis of a time chart shown in FIG. 9.

Figure 9:
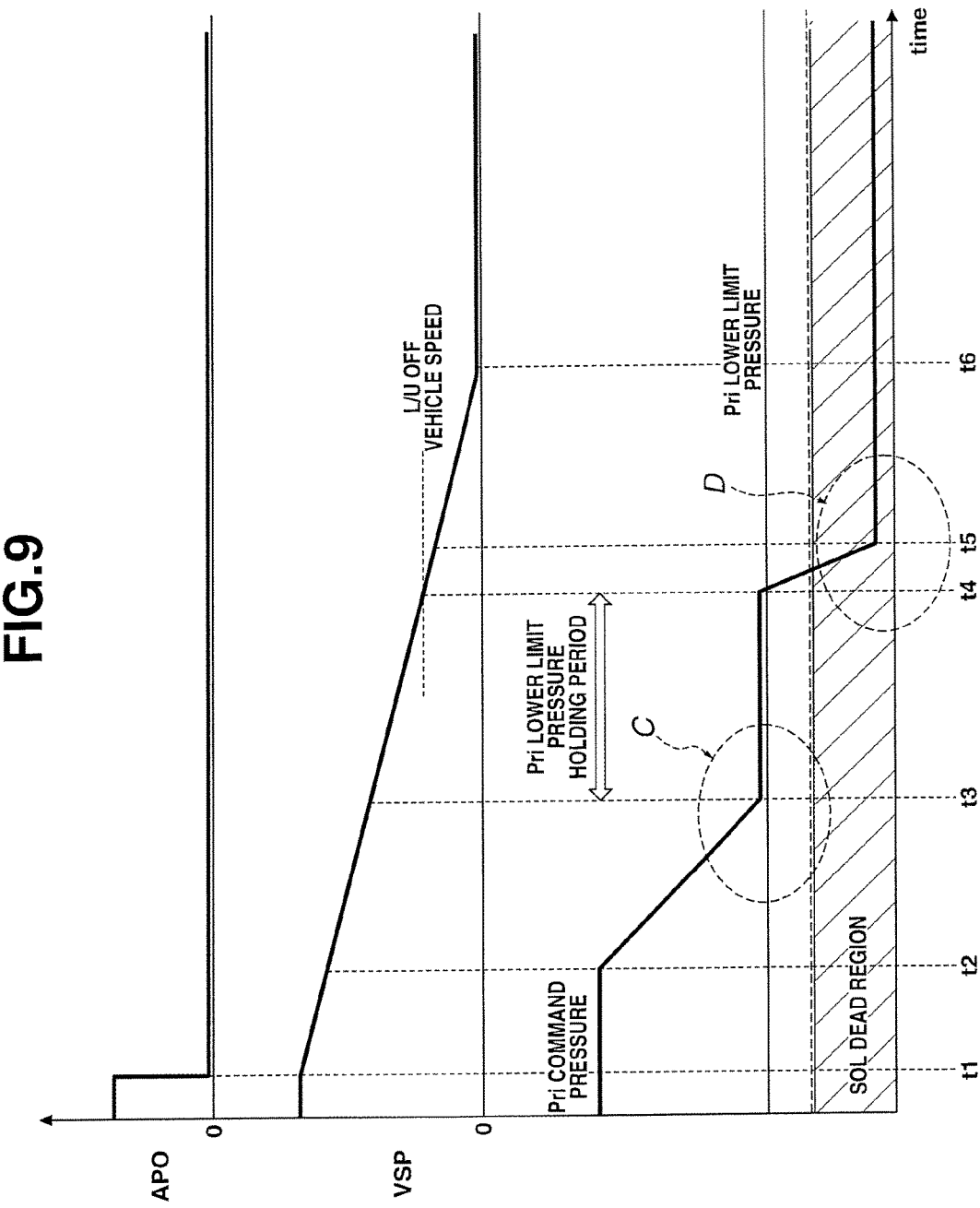
FIG. 9 is a time chart showing each characteristic of an accelerator opening APO, a vehicle speed VSO and a primary command pressure upon regulating the primary pressure lower limit when the high limiter control is operated in the embodiment 1.

In FIG. 9, time t1 is a time when driver's foot is separated (released) from the accelerator pedal. Time t2 is a time of start of the high limit control. Time t3 is a reach time to the primary lower limit pressure. Time t4 is a time when the low vehicle speed condition is satisfied. Time t5 is a reach time to a target primary command pressure. Time t6 is a time of stop of the vehicle.

When driver's foot release operation is performed at time t1, the vehicle speed VSP is coast-decelerated toward time t2. When a start condition of the high limit control is satisfied at time t2 and the high limit control is started, the primary command pressure is decreased toward time t3.

Then, when the primary command pressure reaches the primary lower limit pressure at time t3, as shown by a characteristic encircled with a dotted circle of an arrow C in FIG. 9, the decrease of the primary command pressure is limited, and after that, the primary command pressure is held at the primary lower limit pressure toward time t4. That is, a time period from time t3 to time t4 is a primary lower limit pressure holding period. In this primary lower limit pressure holding period, the primary command pressure does not enter the solenoid dead region (a SOL dead region) of the primary pressure solenoid 11b.

When the low vehicle speed condition of "the vehicle speed<the L/U OFF vehicle speed" is satisfied at time t4, the limit (the regulation) of the decrease of the primary command pressure is released or cancelled. And, the primary command pressure is decreased while passing through the solenoid dead region (the SOL dead region) at a gradient that is steeper than a decrease gradient of a time period between time t2 and time t3. Then, as shown by a characteristic encircled with a dotted circle of an arrow D in FIG. 9, the primary command pressure reaches the target primary command pressure at time t5. Further, the vehicle stops by a brake operation etc. at time t6.

[Feature of Primary Pressure Lower Limit Regulation Control]

In the embodiment 1, if the operation of the high limiter control is started when the transmission ratio is present at the High transmission ratio side with respect to the High limit line, the primary command pressure to the primary pressure solenoid 11b is limited to the decrease up to the High limiter-operated final target primary lower limit pressure that is the primary pressure lower limit.

That is, by the fact that the transmission ratio is present at the High transmission ratio side with respect to the High limit line, by the start of the operation of the high limiter control, the downshift toward the Low-transmission ratio is commanded. Although the primary command pressure is in the pressure-release direction in this downshift, the primary command pressure is limited to the decrease up to the High limiter-operated final target primary lower limit pressure. Therefore, the primary command pressure is prevented from passing through the region of the solenoid dead region of the primary pressure solenoid 11b, then the primary pressure Ppri is prevented from being unstable due to the hydraulic pressure control in the solenoid dead region. Hence, even if the feedback control of the transmission ratio is carried out, the hunting of the primary command pressure can be suppressed.

As a consequence, when decreasing the primary command pressure by the operation of the high limit control, the hunting of the transmission ratio can be prevented.

In the embodiment 1, the transmission controller 12 is configured so that the primary pressure lower limit is determined to the threshold value A (=the High limiter-operated final target primary lower limit pressure) that is higher than the dead region of the primary pressure solenoid 11b.

That is, even though the primary command pressure is decreased, the primary command pressure is subjected to the limit of the decrease before entering the dead region of the primary pressure solenoid 11b.

Therefore, it is surely possible to prevent the hunting of the transmission ratio when decreasing the primary command pressure by the operation of the high limit control.

In the embodiment 1, the transmission controller 12 is configured so that when, even if the High transmission ratio condition (step S1 in FIG. 4) and the high limiter control operation condition (step S2) are both satisfied, the deceleration condition (step S3) indicating that the vehicle deceleration is greater than the setting deceleration is satisfied, the decrease of the primary command pressure up to the primary pressure lower limit is not regulated (imposed) (step S1→step S2→step S3→step S4).

That is, if the lower limit of the primary command pressure is regulated (imposed), in a condition in which a pressure balance is strict (for instance, in a coast L/U OFF condition), deterioration in Low-return performance appears. In contrast, if the primary command pressure passes through the dead region of the primary pressure solenoid 11b by a rapid deceleration, an influence of the hunting by the feedback control can be reduced.

Therefore, when the deceleration condition (step S3) is satisfied, by not regulating (imposing) the lower limit of the primary command pressure, the deterioration in Low-return performance is reduced while preventing the problem of the hunting.

In the embodiment 1, the transmission controller 12 is configured so that when, even if the High transmission ratio condition (step S1) and the high limiter control operation condition (step S2) are both satisfied, the low vehicle speed condition (step S5) indicating that the vehicle speed is equal to or less than the L/U OFF vehicle speed is satisfied, the decrease of the primary command pressure up to the primary pressure lower limit is not regulated (imposed) (step S1→step S2→step S3→step S5→step S4).

That is, if the lower limit of the primary command pressure is regulated (imposed), in a condition such as a low vehicle speed region, deterioration in Low-return performance appears. The low vehicle speed region is a region where the control of the secondary pressure Psec is not secured because of the strict pressure balance, and the influence of the hunting by the feedback control can be reduced.

Therefore, when the low vehicle speed condition (step S5) is satisfied, by not regulating (imposing) the lower limit of the primary command pressure, the deterioration in Low-return performance is reduced while preventing the problem of the hunting.

In the embodiment 1, when regulating (imposing) the decrease up to the primary pressure lower limit, the secondary pressure Psec to secure the pressure control margin of the primary pressure Ppri is determined as the High limiter-operated final target secondary lower limit pressure. In the high limiter control, the limit is imposed on each rate of change of the increase of the secondary command pressure up to the High limiter-operated final target secondary lower limit pressure and the decrease of the primary command pressure up to the High limiter-operated final target primary lower limit pressure, and the forced downshift is carried out while coordinating with each other (FIG. 7).

That is, when keeping the secondary command pressure in an increased state, it is possible to perform the forced downshift by the primary command pressure. Then, by imposing the limit on each rate of change of the increase of the secondary command pressure and the decrease of the primary command pressure and coordinating with each other, off-balance of the pressure due to a rapid change of the secondary pressure Psec does not occur.

Hence, the forced downshift by the primary command pressure is secured, then the forced downshift is performed while keeping the pressure balance between the primary pressure Ppri and the secondary pressure Psec.

Next, effects will be explained.

The control device for the continuously variable transmission 4 having the auxiliary transmission of the embodiment 1 obtains the following effects.

(1) A control device for a continuously variable transmission (4) comprises: a continuously variable transmission mechanism (a variator) 20 continuously varying a transmission ratio by changing a winding diameter of a belt 23 with respect to a primary pulley 21 and a secondary pulley 22; a hydraulic pressure control circuit 11 having a primary pressure solenoid 11b that controls a primary pressure Ppri supplied to the primary pulley 21; and a transmission ratio controller (a transmission ratio control unit) 12 configured to control the transmission ratio by a feedback control that fits an actual transmission ratio corresponding value (a primary rotation speed Npri) to a target transmission ratio corresponding value (a target primary rotation speed Npri*). And, the transmission ratio controller 12 has a high limiter control unit (FIG. 5) configured to, when receiving a high transmission ratio limiting request, perform a high limiter control that limits the transmission ratio to a predetermined high limit transmission ratio (a High limit line); and a primary pressure lower limit regulation control unit (FIG. 4) configured to, when an operation of the high limiter control is started during a time period when the transmission ratio is present at a High transmission ratio side with respect to the high limit transmission ratio (a High limit line), regulate a decrease of a primary command pressure to the primary pressure solenoid 11b up to a primary pressure lower limit (a High limiter-operated final target primary lower limit pressure).

Therefore, when decreasing the primary command pressure by the operation of the high limit control, the hunting of the transmission ratio can be prevented.

(2) The primary pressure lower limit regulation control unit (FIG. 4) is configured to set the primary pressure lower limit (a High limiter-operated final target primary lower limit pressure) to a threshold value A that is higher than a dead region of the primary pressure solenoid 11b.

Therefore, in addition to the effect of (1), when decreasing the primary command pressure by the operation of the high limit control, the hunting of the transmission ratio can be surely prevented.

(3) When, even if a High transmission ratio condition (S1) and a high limiter control operation condition (S2) are both satisfied, a deceleration condition (S3) indicating that a vehicle deceleration is greater than a setting deceleration is satisfied, the primary pressure lower limit regulation control unit (FIG. 4) is configured not to regulate the decrease of the primary command pressure up to the primary pressure lower limit (S4).

Therefore, in addition to the effect of (1) and (2), when the deceleration condition (S3) is satisfied, by not regulating (imposing) the lower limit of the primary command pressure, the deterioration in Low-return performance is reduced while preventing the problem of the hunting.

(4) When, even if a High transmission ratio condition (S1) and a high limiter control operation condition (S2) are both satisfied, a low vehicle speed condition (S5) indicating that a vehicle speed is equal to or less than a setting vehicle speed (an L/U OFF vehicle speed) is satisfied, the primary pressure lower limit regulation control unit (FIG. 4) is configured not to regulate the decrease of the primary command pressure up to the primary pressure lower limit (S4).

Therefore, in addition to the effect of (1) to (3), when the low vehicle speed condition (step SE) is satisfied, by not regulating (imposing) the lower limit of the primary command pressure, the deterioration in Low-return performance is reduced while preventing the problem of the hunting.

(5) When regulating the decrease up to the primary pressure lower limit (a High limiter-operated final target primary lower limit pressure), the high limiter control unit (FIG. 5) is configured to determine a secondary pressure Psec to secure a pressure control margin of the primary pressure Ppri as a secondary pressure lower limit (a High limiter-operated final target secondary lower limit pressure), and impose a limit on each rate of change of an increase of a secondary command pressure up to the secondary pressure lower limit (a High limiter-operated final target secondary lower limit pressure) and the decrease of the primary command pressure up to the primary pressure lower limit (a High limiter-operated final target primary lower limit pressure), then carry out a forced downshift while coordinating with each other (FIG. 7).

Therefore, in addition to the effect of (1) to (4), the forced downshift by the primary command pressure is secured, then the forced downshift is performed while keeping the pressure balance between the primary pressure Ppri and the secondary pressure Psec.

Although the control device for the continuously variable transmission of the present invention has been explained on the basis of the embodiment 1, a specified configuration is not limited to the embodiment 1. The configuration includes all design modifications and equivalents belonging to the technical scope of the present invention.

The embodiment 1 shows, as the hydraulic pressure control circuit 11, an example of the single pressure control system with the pressure to the secondary pulley 22 being the line pressure from the line pressure solenoid 11a. However, as the hydraulic pressure control circuit, it could be a double pressure control system that controls each of the primary pressure and the secondary pressure by the primary pressure solenoid and a secondary pressure solenoid. Here, also in a case of the double pressure control system, when the feedback control for first determining the secondary pressure is performed, the problem of the hunting occurs upon decreasing the primary command pressure.

The embodiment 1 shows, as the high limiter control unit, an example of a control that, with the aim of improving heating performance, receives the minimum engine rotation speed command from the engine controller at engine cooling-down, and executes the high limiter operation. However, as the high limiter control unit, it could be a unit executing the high limiter control that limits the transmission ratio according to a drivability request. Further, for unit protection, it might be a unit executing the high limiter control that limits the transmission ratio. In brief, the high limiter control unit includes a unit that executes the high limiter control that limits the transmission ratio to a predetermined high limit transmission ratio.

In the embodiment 1, as an example, the present invention is applied to the continuously variable transmission 4 having the auxiliary transmission mechanism. However, the present invention can be applied to a continuously variable transmission having no auxiliary transmission mechanism. In brief, the present invention can be applied to a continuously variable transmission having an operation function of the high limiter control.

In the embodiment 1, as an example, the control device for the continuously variable transmission 4 having the auxiliary transmission mechanism of the present invention is mounted in the engine vehicle. However, the control device for the continuously variable transmission 4 having the auxiliary transmission mechanism of the present invention can be mounted in a hybrid vehicle and an electric vehicle except the engine vehicle.

The invention claimed is:

1. A control device for a continuously variable transmission comprising:
    a continuously variable transmission mechanism configured to continuously vary a transmission ratio by changing a winding diameter of a belt with respect to a primary pulley and a secondary pulley;
    a hydraulic pressure control circuit having a primary pressure solenoid configured to control a primary pressure supplied to the primary pulley; and
    a transmission ratio controller configured to control the transmission ratio by a feedback control that fits an actual transmission ratio corresponding value to a target transmission ratio corresponding value, the transmission ratio controller including
        a high limiter control unit configured to, when receiving a high transmission ratio limiting request, perform a high limiter control that limits the transmission ratio to a predetermined high limit transmission ratio; and
        a primary pressure lower limit regulation control unit configured to, on condition that an operation of the high limiter control is started during a time period when the transmission ratio is present at a High transmission ratio side with respect to the high limit transmission ratio and a vehicle deceleration is equal to or less than a setting deceleration, regulate a decrease of a primary command pressure to the primary pressure solenoid up to a primary pressure lower limit.

2. The control device for the continuously variable transmission as claimed in claim 1, wherein:
    the primary pressure lower limit regulation control unit is configured to set the primary pressure lower limit to a threshold value that is higher than a dead region of the primary pressure solenoid, the dead region corresponding to a no-reaction region of the primary pressure solenoid.

3. The control device for the continuously variable transmission as claimed in claim 1, wherein:
    when, even when a High transmission ratio condition indicating that the transmission ratio is present at the High transmission ratio side with respect to the high limit transmission ratio and a high limiter control operation condition are both satisfied, and a deceleration condition indicating that the vehicle deceleration is greater than the setting deceleration is satisfied, the primary pressure lower limit regulation control unit is configured not to regulate the decrease of the primary command pressure up to the primary pressure lower limit.

4. The control device for the continuously variable transmission as claimed in claim 1, wherein:
    when, even when a High transmission ratio condition indicating that the transmission ratio is present at the High transmission ratio side with respect to the high limit transmission ratio and a high limiter control operation condition are both satisfied, and a low vehicle speed condition indicating that a vehicle speed is equal to or less than a setting vehicle speed is satisfied, the primary pressure lower limit regulation control unit is configured not to regulate the decrease of the primary command pressure up to the primary pressure lower limit.

5. The control device for the continuously variable transmission as claimed in claim 1, wherein:
    when regulating the decrease up to the primary pressure lower limit, the high limiter control unit is configured to determine a secondary pressure to secure a pressure control margin of the primary pressure as a secondary pressure lower limit, and impose a limit on each rate of change of an increase of a secondary command pressure up to the secondary pressure lower limit and the decrease of the primary command pressure up to the primary pressure lower limit, and then carry out a forced downshift while coordinating control of the primary and secondary command pressures with each other.

6. A control device for a continuously variable transmission comprising:
a continuously variable transmission mechanism configured to continuously vary a transmission ratio by changing a winding diameter of a belt with respect to a primary pulley and a secondary pulley;
a hydraulic pressure control circuit having a primary pressure solenoid configured to control a primary pressure supplied to the primary pulley; and
a transmission ratio controller configured to control the transmission ratio by a feedback control to fit an actual transmission ratio corresponding value to a target transmission ratio corresponding value, the transmission ratio controller configured to
when receiving a first transmission ratio limiting request, perform a first limiter control that limits the transmission ratio to a predetermined first limit transmission ratio; and
on condition that an operation of the first limiter control is started during a time period when the transmission ratio is present at a first transmission ratio side with respect to the first limit transmission ratio and a vehicle deceleration is equal to or less than a setting deceleration, regulate a decrease of a primary command pressure to the primary pressure solenoid to a primary pressure limit.

7. The control device for the continuously variable transmission as claimed in claim 6, wherein the transmission controller is further configured to set the primary pressure limit to a threshold value that is higher than a dead region of the primary pressure solenoid, the dead region corresponding to a no-reaction region of the primary pressure solenoid.

8. The control device for the continuously variable transmission as claimed in claim 6, wherein:
when, even when a transmission ratio condition indicating that the transmission ratio is present at the first transmission ratio side with respect to the first limit transmission ratio and a first limiter control operation condition are both satisfied, and a deceleration condition indicating that the vehicle deceleration is greater than the setting deceleration is satisfied, the transmission controller is configured not to regulate the decrease of the primary command pressure to the primary pressure limit.

9. The control device for the continuously variable transmission as claimed in claim 6, wherein:
when, even when a first transmission ratio condition indicating that the transmission ratio is present at the first transmission ratio side with respect to the first limit transmission ratio and a first limiter control operation condition are both satisfied, and a low vehicle speed condition indicating that a vehicle speed is equal to or less than a setting vehicle speed is satisfied, the transmission controller is configured not to regulate the decrease of the primary command pressure to the primary pressure limit.

10. The control device for the continuously variable transmission as claimed in claim 6, wherein:
when regulating the decrease to the primary pressure limit, the transmission controller is configured to determine a secondary pressure to secure a pressure control margin of the primary pressure as a secondary pressure limit, and impose a limit on each rate of change of an increase of a secondary command pressure to the secondary pressure limit and the decrease of the primary command pressure to the primary pressure limit, and then carry out a forced downshift while coordinating control of the primary and secondary command pressures with each other.

* * * * *